US011663302B1

(12) United States Patent
Gershon

(10) Patent No.: US 11,663,302 B1
(45) Date of Patent: May 30, 2023

(54) SYSTEM AND METHOD FOR QUICKLY ACCESSING A LOCKED ELECTRONIC DEVICE

(71) Applicant: Devdan Gershon, Norristown, PA (US)

(72) Inventor: Devdan Gershon, Norristown, PA (US)

( * ) Notice: Subject to any disclaimer, the term of this patent is extended or adjusted under 35 U.S.C. 154(b) by 0 days.

(21) Appl. No.: 17/559,249

(22) Filed: Dec. 22, 2021

(51) Int. Cl.
*G06F 21/31* (2013.01)

(52) U.S. Cl.
CPC .................................. *G06F 21/31* (2013.01)

(58) Field of Classification Search
CPC ........................................................ G06F 21/31
See application file for complete search history.

(56) References Cited

U.S. PATENT DOCUMENTS

| | | | | |
|---|---|---|---|---|
| 5,347,589 A * | 9/1994 | Meeks | ................... | G06V 40/30 382/119 |
| 8,174,503 B2 * | 5/2012 | Chin | .................. | G06F 3/04883 345/173 |
| 8,504,842 B1 * | 8/2013 | Meacham | ............... | G06F 21/36 726/16 |
| 9,030,293 B1 * | 5/2015 | Tabak | ..................... | G06F 21/31 340/5.54 |
| 9,357,391 B1 * | 5/2016 | Alsvig | ..................... | G06F 21/36 |
| 9,430,084 B2 * | 8/2016 | Kim | ........................ | H04M 1/67 |
| 9,430,634 B1 * | 8/2016 | Dotan | .................. | H04L 63/083 |
| 9,509,753 B2 * | 11/2016 | Park | ................. | H04N 21/41265 |
| 9,588,641 B2 * | 3/2017 | Jung | ..................... | G06F 3/0488 |
| 9,589,118 B2 * | 3/2017 | Agarwal | ................. | G06F 21/31 |
| 10,791,104 B2 * | 9/2020 | Rutherford | ............ | G06Q 40/03 |
| 2009/0210939 A1 * | 8/2009 | Xu | .......................... | G06F 21/36 726/19 |
| 2009/0313693 A1 * | 12/2009 | Rogers | .................. | H04W 12/06 345/173 |
| 2010/0008551 A9 * | 1/2010 | Schiller | ............... | G06F 3/04886 382/187 |
| 2010/0139992 A1 * | 6/2010 | Delia | ..................... | G06V 40/37 178/19.01 |

(Continued)

OTHER PUBLICATIONS

Lu, H. and Li, Y., Apr. 2015, Gesture on: Enabling always-on touch gestures for fast mobile access from the device standby mode. In Proceedings of the 33rd Annual ACM Conference on Human Factors in Computing Systems (pp. 3355-3364). (Year: 2015).*

(Continued)

*Primary Examiner* — James R Turchen
(74) *Attorney, Agent, or Firm* — Joseph E. Maenner; Maenner & Associates, LLC

(57) ABSTRACT

A non-transitory machine-readable storage medium, having encoded thereon program code is provided. When the program code is executed by a machine, the machine implements a method for operating an application on an electronic device without having to perform numerous steps to access the predetermined feature after unlocking the device for functions that require authentication. The method includes the steps of providing an electronic device requiring a password to unlock the device, the device having a screen, wherein the device is locked; receiving a first recognizable scribbled pattern on the screen, the pattern being provided by a user, wherein the first recognizable scribbled pattern is associated with a first specific application; and unlocking only the specific application for use by the user.

19 Claims, 5 Drawing Sheets

(56) References Cited

U.S. PATENT DOCUMENTS

| | | | |
|---|---|---|---|
| 2010/0321304 A1* | 12/2010 | Rofougaran | G06F 21/36 345/173 |
| 2010/0328032 A1* | 12/2010 | Rofougaran | H04W 12/062 340/5.82 |
| 2011/0041102 A1* | 2/2011 | Kim | G06F 3/04883 345/173 |
| 2011/0156867 A1* | 6/2011 | Carrizo | H04L 63/0861 345/173 |
| 2011/0187497 A1* | 8/2011 | Chin | H04W 12/68 726/6 |
| 2011/0302649 A1* | 12/2011 | Foster | G06F 21/36 726/19 |
| 2013/0091561 A1* | 4/2013 | Bruso | G06F 21/31 726/16 |
| 2013/0111580 A1* | 5/2013 | Checco | G06V 40/37 726/19 |
| 2013/0148024 A1* | 6/2013 | Shin | H04N 21/42204 705/44 |
| 2013/0239192 A1* | 9/2013 | Linga | G06F 21/44 726/3 |
| 2013/0263251 A1* | 10/2013 | Fleizach | G06F 21/36 726/19 |
| 2014/0165012 A1* | 6/2014 | Shen | G06F 9/4451 715/863 |
| 2014/0281548 A1* | 9/2014 | Boyer | G06F 21/57 713/171 |
| 2015/0006638 A1* | 1/2015 | Jain | H04L 51/043 709/204 |
| 2015/0059002 A1* | 2/2015 | Balram | G06F 3/011 726/28 |
| 2015/0071505 A1* | 3/2015 | Kim | G06F 3/04883 382/119 |
| 2015/0301991 A1* | 10/2015 | He | G06F 16/958 715/234 |
| 2016/0042165 A1* | 2/2016 | Nicholson | G06V 30/1423 726/19 |
| 2016/0292410 A1* | 10/2016 | Lu | G06F 3/0488 |
| 2018/0205716 A1* | 7/2018 | Rutherford | H04L 9/3213 |
| 2019/0108329 A1* | 4/2019 | Yan | G06F 21/45 |
| 2019/0294246 A1* | 9/2019 | Lin | G06F 3/0233 |
| 2020/0320407 A1* | 10/2020 | Xiao | G06N 5/02 |
| 2020/0379621 A1* | 12/2020 | Sartori | G06F 3/0488 |
| 2021/0252979 A1* | 8/2021 | Pomytkin | G06F 3/04815 |
| 2022/0214753 A1* | 7/2022 | Singh | G07F 19/207 |
| 2022/0261570 A1* | 8/2022 | Pelissier | G06V 40/30 |
| 2022/0261585 A1* | 8/2022 | Ong | H04L 9/3242 |

OTHER PUBLICATIONS

Martinez-Diaz M, Fierrez J, Galbally J. The DooDB graphical password database: data analysis and benchmark results. IEEE Access. Sep. 16, 2013;1:596-605. (Year: 2013).*

Van Nguyen T, Sae-Bae N, Memon N. Finger-drawn pin authentication on touch devices. In2014 IEEE International Conference on Image Processing (ICIP) Oct. 27, 2014 (pp. 5002-5006). IEEE. (Year: 2014).*

* cited by examiner

SYSTEM AND METHOD FOR QUICKLY ACCESSING A LOCKED ELECTRONIC DEVICE

BACKGROUND OF THE INVENTION

Field of the Invention

The invention relates to a system and method for accessing predetermined features of a locked electronic device without having to perform many steps to access the predetermined feature.

Description of the Related Art

Cell phones and other electronic devices allow users to access multitudes of functions from a single device. To prevent unauthorized access to these functions, the devices are equipped with password that restrict access to only those parties who know the passwords. Passwords are essential to maintain the privacy of the devices and are occasionally awkward to use.

It would be beneficial to provide a system that allows a user to access a function of their electronic device without having to perform numerous steps to access the predetermined feature after unlocking the device for functions that require authentication or to access the redetermined feature without unlocking the device for functions such as camera, calculator, flashlight, that do not require authentication.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a non-transitory machine-readable storage medium, having encoded thereon program code, wherein, when the program code is executed by a machine, the machine implements a method for operating an application on an electronic device without having to perform numerous steps to access the predetermined feature after unlocking the device for functions that require authentication. The method comprises providing an electronic device requiring a password to unlock the device, the device having a screen, wherein the device is locked; receiving a first recognizable scribbled pattern on the screen, the pattern being provided by a user, wherein the first recognizable scribbled pattern is associated with a first specific application; and unlocking only the specific application for use by the user.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
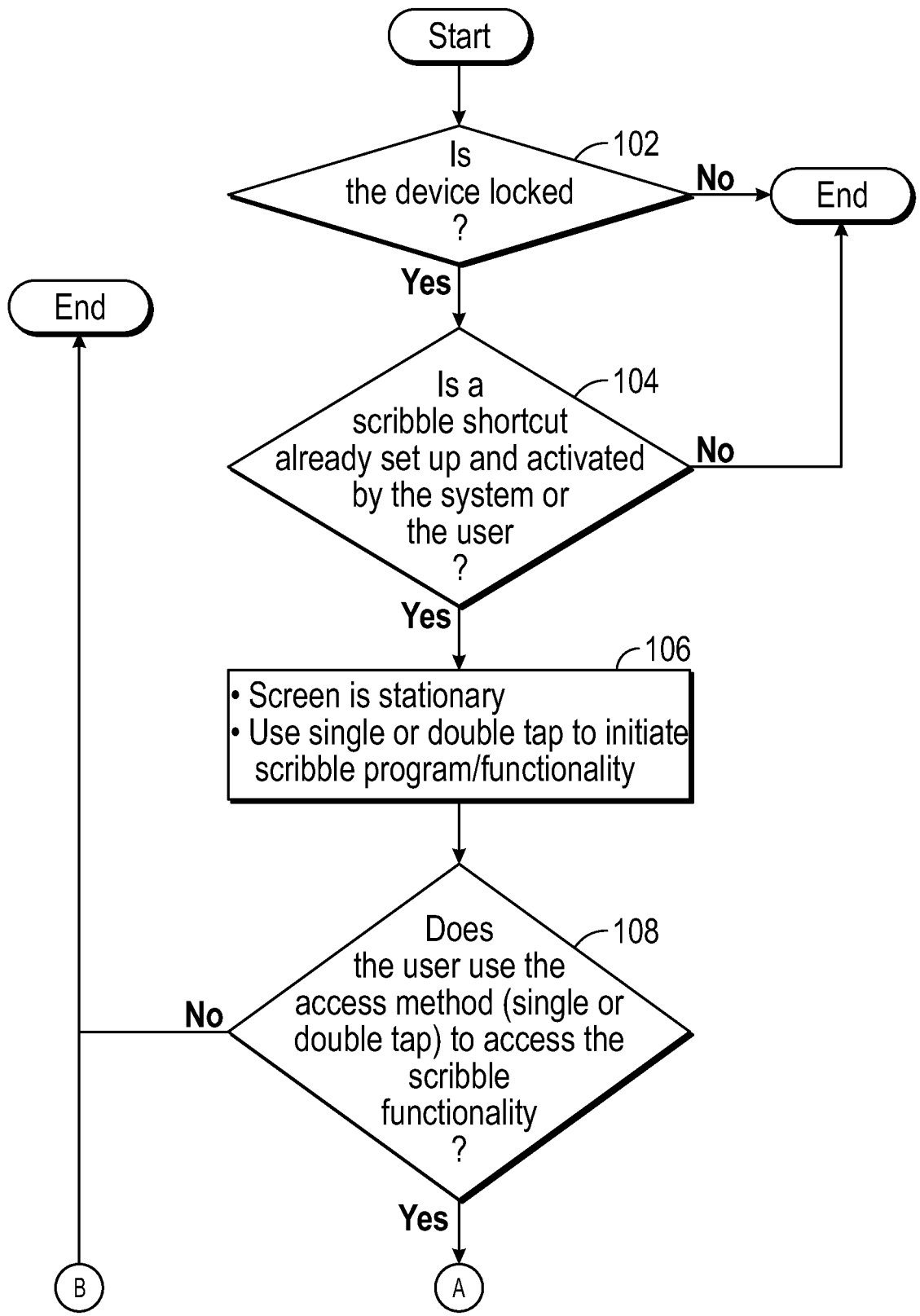
FIG. 1 is a flowchart showing an exemplary operation of the present system.
Figure 1A:
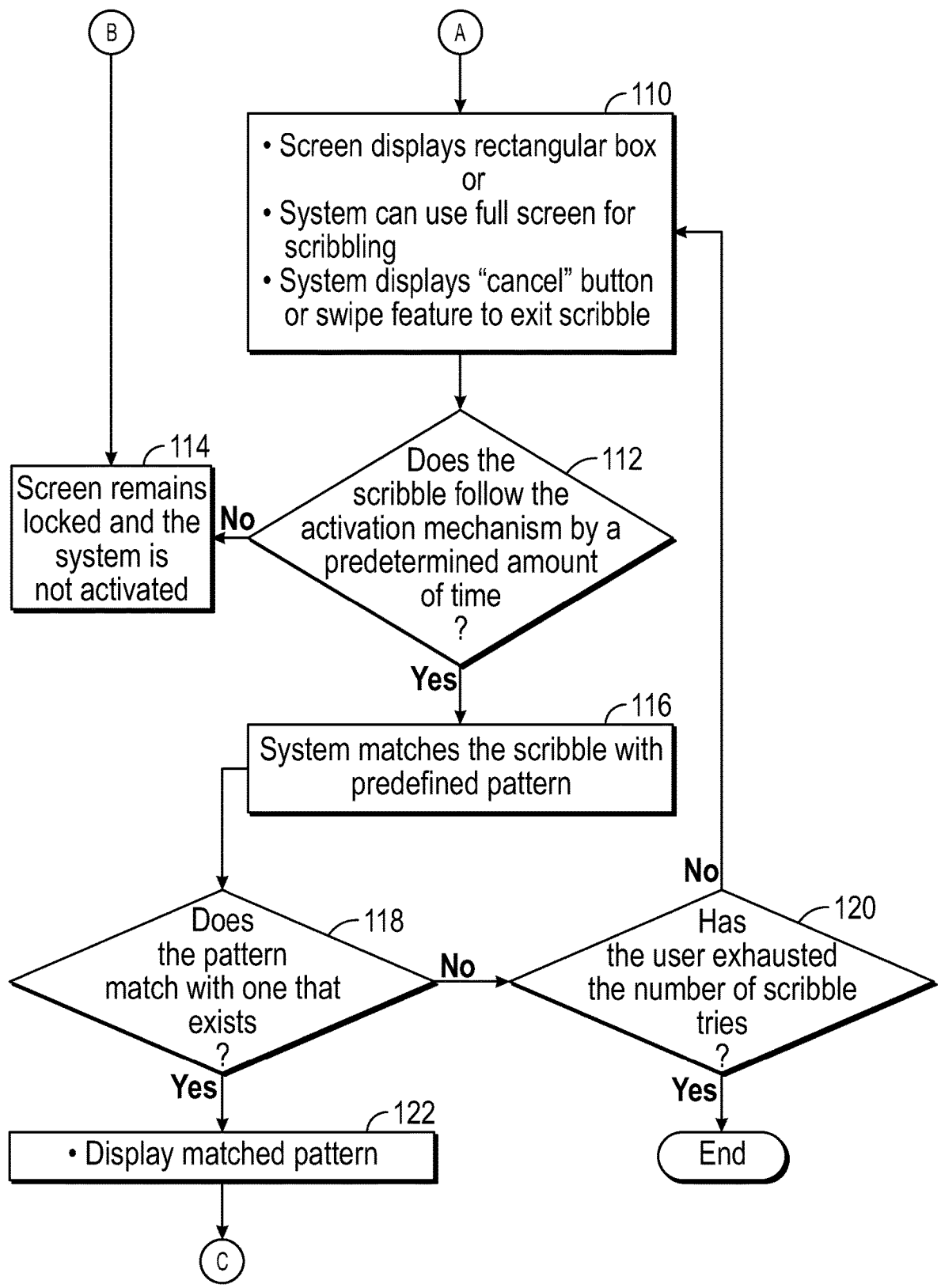
FIG. 1A is a continuation of the flowchart of FIG. 1.
Figure 1B:
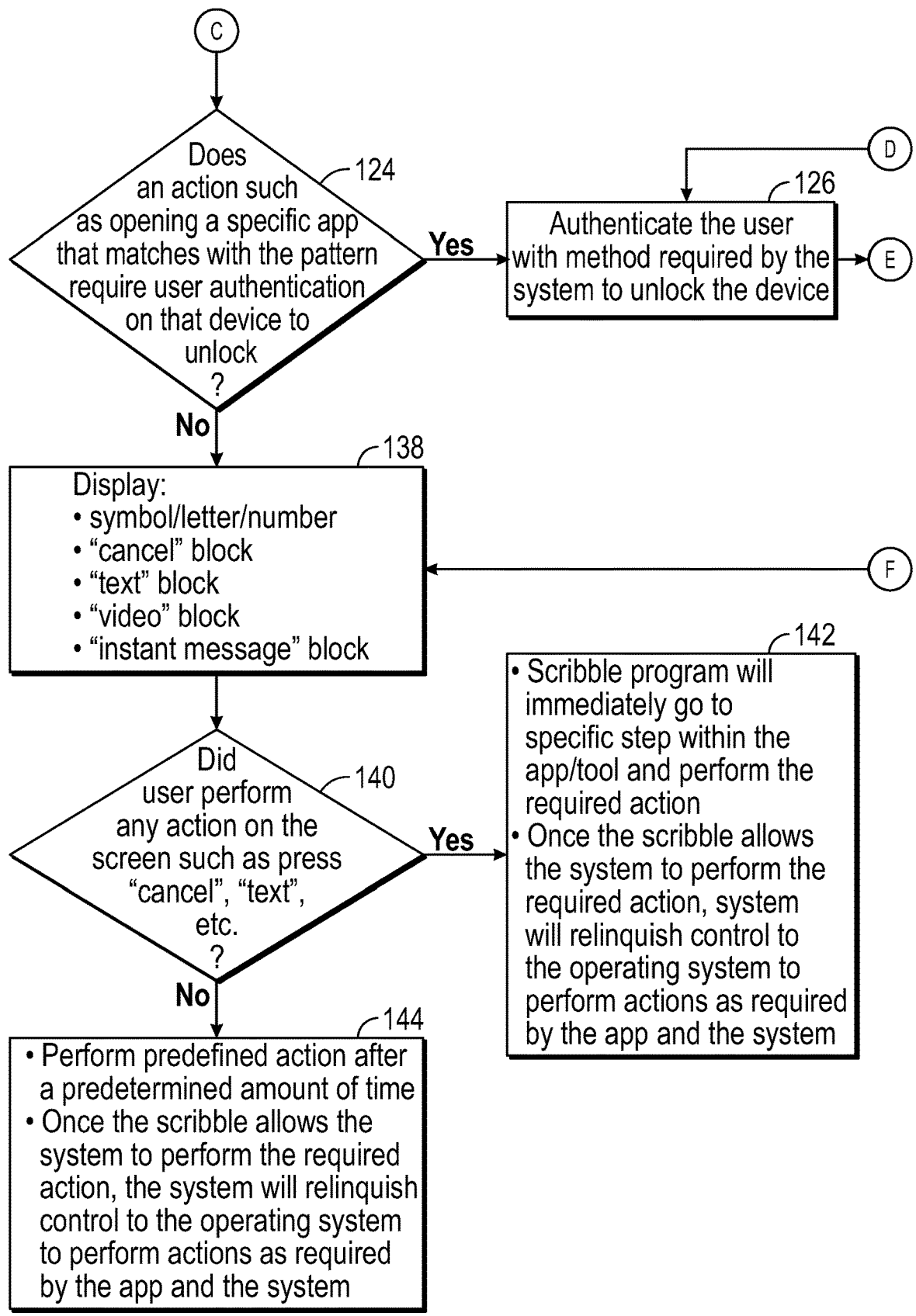
FIG. 1B is a continuation of the flowchart of FIG. 1A.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a non-transitory machine-readable storage medium, having encoded thereon program code, wherein, when the program code is executed by a machine, the machine implements a method for operating an application ("App") on a locked electronic device without having to perform numerous steps to access the predetermined feature after unlocking the device for functions that require authentication.

The inventive system and method allows a user to access a full keyboard (either a standard keyboard or a specific keyboard that the user is allowed to use) on a locked screen by drawing (scribbling) a specific symbol, such as, for example, the letter 'K'. In response, the system will display a keyboard on a locked screen of an electronic device and allow the user to type a specific letter/number/symbol/word and tap in a designated area or enter a predefined customized key to go to a specific App/step in the App/phone call etc.

The inventive system allows a user to scribble a customizable pattern on the locked screen, regardless of the technology used for touch-over on its display area. Drawing a default/customized pattern will open a specific application (such as Flashlight, Camera, a banking application, a trading application, WhatsApp, Facebook, etc.) without the user having to go through numerous steps in order to open the App/tool/function. The default/customized pattern should open the desired App/tool/function with or without authentication, depending on the security requirements of that specific tool/App/function.

Operation of the method described herein is independent of the type of electronic device, the operating system used by the electronic device, and the technology used for a touch screen on the electronic device. The inventive system can be embedded in the operating system of the device on which the system is being used. This system is applicable to all operating systems, such as IOS, Android, Microsoft Proprietary Software, Windows 10 Mobile, etc. This patent should also apply to all types of devices, including watches, iPads, tablets, iPods, iPhone, laptops, and every other touchscreen device.

Operation of the system is also independent of the type of user authentication method used to unlock the screen on the electronic device, including face ID, voice recognition, password, fingerprint, retina scan, etc.

Figure 1C:
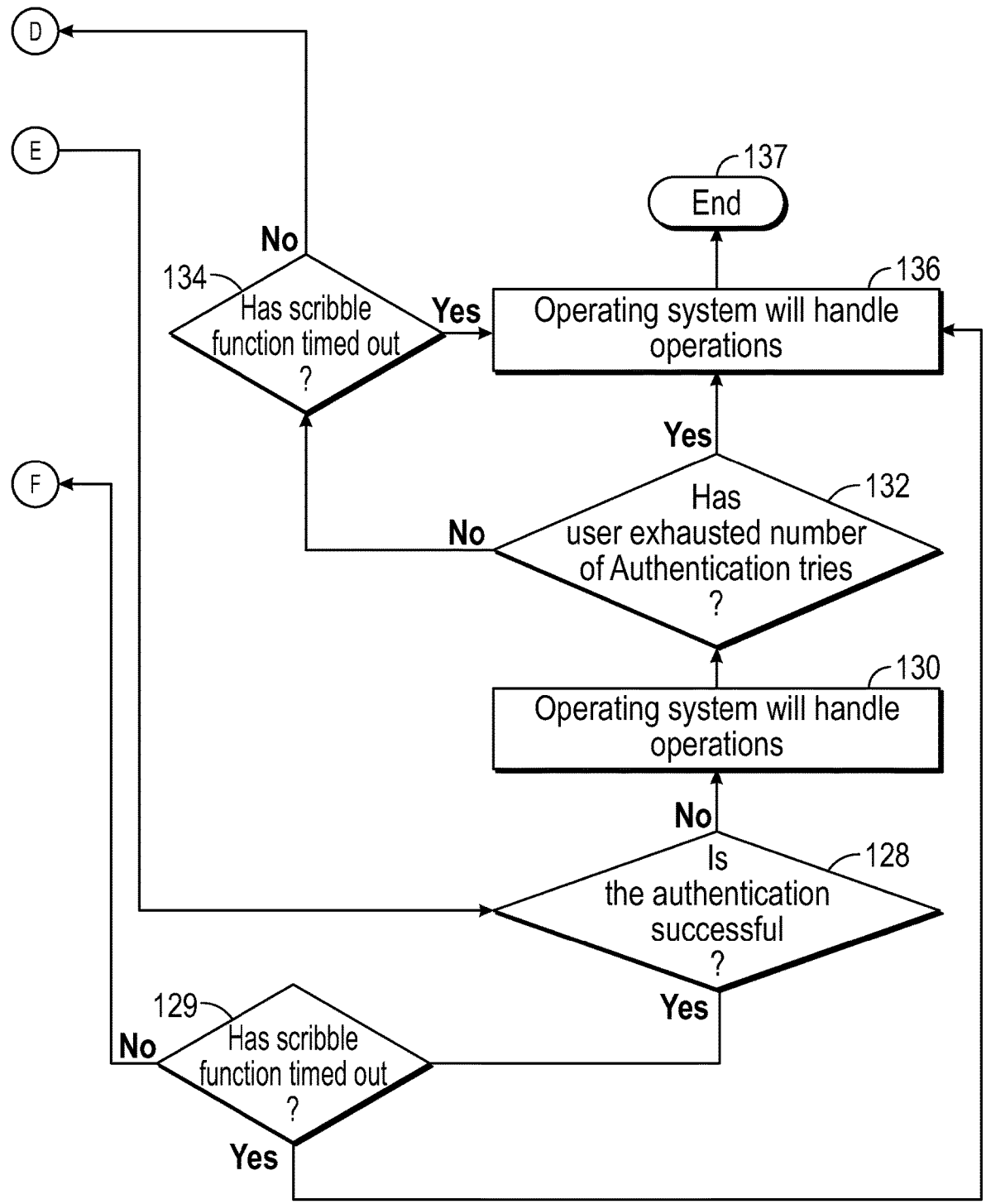
FIG. 1C is a continuation of the flowchart of FIG. 1B.

Referring to the flowchart 100 of FIGS. 1-1C, in step 102, the method provides the step of providing an electronic device requiring a method of authentication to unlock the device, the device having a screen, wherein the device is locked; however, the screen 202 can be lit or unlit or frozen so that the back screen does not move while user scribbles a pattern on the screen 202. The screen 202 must be immovable, allowing the user to scribble a pattern 204 on the screen 202. The user can draw the desired pattern 204 even if the device 200 is upside-down, sideways, or facing any other direction and the pattern 204 will be recognized. The scribble pattern 204 may or may not be displayed on the locked screen 202. Either way, the system can read the pattern 204 based on the starting and ending points of the pattern 204 and identify the mapped letter/symbol and open the tool/App or the step within the App/tool/step in the App/function.

In step 104, the method determines whether a scribble shortcut is already set up and activated by the system or the user. If so, the method proceeds to step 106, which, while requiring the screen to be stationary, allows the user to activate the system by either a double or single tap the screen 202 to be used for initiating the inventive scribble functionality. Alternatively, the user can place two fingers on screen 202 and drag the fingers across screen 202. Once screen 202 is activated, the user can draw the desired scribble pattern 204 on screen 202.

To indicate that the scribble pattern 204 is complete, the user can scribble a specific pattern 204 followed by a horizontal line from left to right or right to left or scribble a specific pattern 204 followed by a vertical line from up and down or down to up, just scribble a specific pattern 204, tap and scribble a specific pattern 204, or any other recognizable tactile signal applied to screen 202, to indicate that the scribble pattern 204 is complete.

The determination of the number of taps or other system activation mechanism required to activate the system can be embedded in the system operating system. If, in either step 102 or step 104, the device is not locked or the scribble short cut is not already set up and activated, the process ends.

Figure 2:
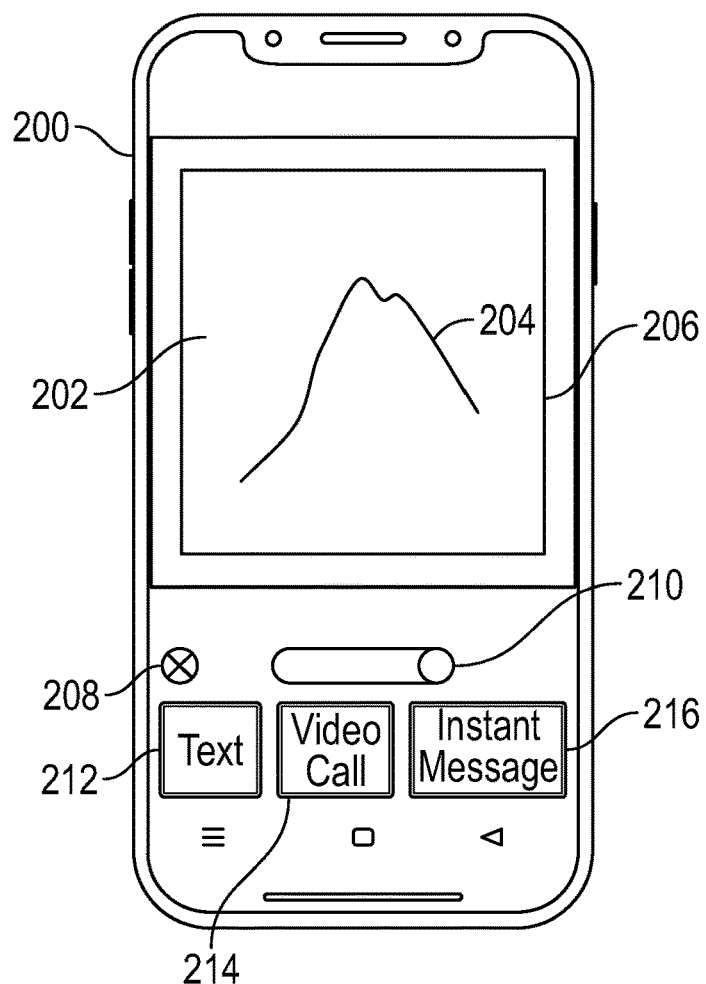
FIG. 2 is an exemplary Graphical User Interface ("GUI") used with the present system.

In step 108, the user uses the access method (single tap, double tap, or any recognized function on screen 202 in step 106) to access the scribble functionality. In step 110, the screen can display a box in which the user can scribble a shortcut. An exemplary GUI of screen 202 on a device 200 with an exemplary scribble pattern 204 drawn in a box 206 is shown in FIG. 2. Alternatively, instead of box 206, the entirety of screen 202 can be used. Additionally, a "Cancel" button 208 or a "swipe" feature 210 is provided to allow the user to exit from the system.

In step 112, the system determines whether the scribble follows the activation mechanism by a predetermined amount of time such as, for example, three seconds. If the scribble is not initiated within that timeframe, in step 114, the screen 202 remains locked and the system is not activated.

In step 116, the system provides the step of receiving a first recognizable scribbled pattern on the screen, the pattern being provided by the user and in step 118, the system determines whether the first recognizable scribbled pattern is matchable with a scribble pattern associated with a first specific application. If not, the method reverts back to step 110.

If the method does revert back to step 110 a predetermined number of times in step 120, and the system still is not able to match the scribble with a scribble pattern associated with a first specific application, then the screen 202 remains locked and the system is not activated.

If, in step 118, the scribbled pattern 204 matches a predefined pattern in the system's library of patterns, in step 122, the matched pattern is displayed on screen 202. Next, in step 124, the system determines whether a user authentication is required to unlock the screen 202 and access the desired App. An exemplary App that may require user authentication can be a mobile banking App. If user authentication is required, in step 126, the user authenticates himself/herself with the method required to access the App. In step 128, if the authentication is not successful, then in step 130, the operating system will operate the App as if the App was unsuccessfully opened in its normal manner. In step 132, if the user has not exhausted the predetermined number of authentication tries to open the App, in step 134, the system will determine whether the scribble function has timed out. If the scribble function has not timed out, the process reverts back to step 126. If the system has timed out, in step 136, the system will operate the App as if the App was unsuccessfully opened in its normal manner and in step 137, the process ends. If the user has exhausted the number of authentication tries, in step 136, the system will operate the App as if the App was unsuccessfully opened in its normal manner and in step 137, the process ends.

If, however, in step 128, the authentication is successful, in step 129, the system will determine whether the scribble function has timed out. If the scribble function has not timed out, the process reverts back to step 138, and the system will display the following on screen 202: the symbol/letter/number that matches the scribbled pattern 204, the "Cancel" button 208, a "Text" button 212, a "Video Call" button 214, and an "Instant Message" button 216. Step 140 determines whether the user performed any action on screen 202. If the user did perform an action on screen 202 within a predetermined period of time, in step 142, the system will immediately go to the specific function within its operating system to perform the selected action and relinquish control over the system to the device 200 operating system to perform the requested actions as required by the selected function.

If, however, the user does not perform any action on screen 202 within the predetermined period of time, in step 144, the system will direct to the App associated with scribbled pattern 204 and will relinquish control over the system to the device 200 operating system to perform the requested actions as required by the selected function.

If, in step 129, the scribble function has timed out, in step 136, the system will operate the App as if the App was unsuccessfully opened in its normal manner and in step 137, the process ends.

In an exemplary embodiment, the first recognizable scribbled pattern 204 is predefined by the device and can be 'E" or '911' for making an emergency call, which will dial 911 automatically.

In an exemplary embodiment, specific default scribble patterns 204 can be preset into the device 100 and associated with correlating Apps or functions. The scribble patterns can be in upper case letters, lower case letters, or combinations of both. By way of example only, the following scribble patterns 204 can be associated with the specifically listed tasks:

'L' or 'Li' for accessing the flashlight App.
'C' or 'Ca' for accessing the camera App
'S' first two or more letters for example 'Sea' for going directly into a desired user-assignable browser such as, but not limited to, Safari, Chrome, Mozilla, etc.
'SE" or the first two or more letters (for example 'Set') for accessing the settings of the device.
'T" for Texting.
'Z" for accessing the 'Zoom' App.
'Tk' for accessing the 'TikTok' App.
'D" for accessing the 'Disney+' App.
'Dd' for accessing the 'DoorDash' App.
'TW' for accessing the 'Twitter' App.
'Y" for accessing the 'YouTube' App.
'I' for accessing the 'Instagram' App.
'AC' for accessing the 'Apple Cash' App.
'F' for accessing the 'Facebook' App.
'Sn' for accessing the 'Snapchat' App.
'M' for accessing the 'Facebook Messenger' App.
'G' for accessing the 'Gmail' App.
'A' for accessing the 'Amazon Shopping' App
'N' for accessing the 'Netflix' App.
'GM' for accessing the 'Google Maps' App.
'SP' for accessing the 'Spotify' App.
'W' for accessing the 'WhatsApp' App.
'V' for accessing the 'Venmo' App.
'Gg' for accessing the 'Google' App.
'H' for accessing 'the HBO Max' App.
'K" for accessing the 'Keyboard' Standard or a predefined specific keyboard.
'LI" for accessing the 'Linkedin' App.
'UC' for accessing the 'UC Browser' App.
'U' for accessing the 'Uber' App.
'B' for accessing the 'Bitmoji' App.
'SH' for accessing the 'SHAREit' App.
'GPL' for accessing the 'Google Play' App.
'SH' for accessing the 'SHAREit' App.
'IC' for accessing the 'iCloud' App.
'GP' for accessing 'the Google Pay' App.
'CL" for accessing the 'Calculator' App.
'CLK' for accessing the 'Clock' App.
'P' for accessing the 'Photos/Pictures' App.
Number pattern (assignable) for calling specific contacts from a list of contacts.

In an alternative embodiment, the first recognizable scribbled pattern 204 can defined by the user and can comprises the pattern  " for calling a specific person, such as a significant other or anyone from the user's contact list.

Figure 3:
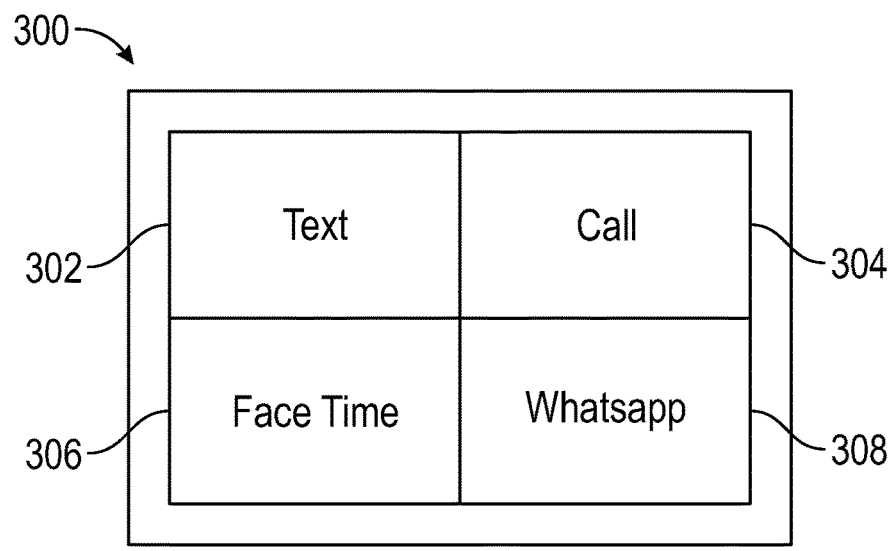
FIG. 3 is an exemplary GUI to provide options for a user to select a specific task.

Certain scribble patterns 204 can provide the user with multiple use options. For example, to communicate with a significant other, the user can desire to Text, Call, Facetime, or perform some other function as identified in boxes 302, 304, 306, 308. In such instances, screen 204 will display a GUI 300, as shown in FIG. 3, that includes options for communication. The user can then tap screen 202 in the box for the desired option to activate that option. Alternatively, if the user does not tap a specific box 302, 304, 306, 308, after a predetermined amount of time, such as two seconds, system automatically defaults to one of the options, such as "Call".

The inventive system and method allows a user to use all upper case and lower case letters from A to Z and all numbers. All letters, common symbols, and special characters, including, but not limited to, a triangle, a heart shape, a circle, a square, a cross sign, a star, a dollar sign, an ampersand, a percentage sign, a "greater than" symbol, a "less than" symbol, a pound sign, a line, brackets, etc.

Numbers and symbols can be customizable (to be mapped to specific App/Tool/Functions) unless they were defaulted by the system. The system maintains unique customizable letters/symbols and not allow those customized symbols/letters/numbers to be assigned to other Apps/tools unless disassociated and made available for any other Apps/tools to use. The system allows the user to assign and remove the customizable letters/symbols/patterns.

When device 200 is locked and user activates the locked screen 202 to activate the scribble feature, the user can pull a keyboard by scribbling 'K', as described above, or, alternatively, the letter 'K' (or 'k') is generated for display on a corner of screen 202, which is also independent of device 200 being held vertically or horizontally. Once the user clicks on the 'K' letter, screen 202 displays a keyboard so that user can type another desired letter(s) and search the desired app/function/tool. If the user does not click on the 'K', the user will still be able to scribble a letter 'K' and generate the keyboard on the screen 202.

In addition to the default pattern or assigned pattern for a specific App/tool/function, if the defaulted pattern is not found, the system searches for the App/tool/function on the device 200 in the order of the scribbled letter/number in the order of the spelling of the App/tool/function. The functions may be predefined based on the limitation of the system to allow the user to use the locked screen 202.

Letters/Numbers/Symbols can be rearranged or reassigned and mapped to any desired tool/App/function. The system allows the user to scribble a pattern 204 with lifting finger and continue to scribble/draw pattern in a given configurable time and allow the user to tap. Once tapped, the system will match that pattern 204 with established mapped location such as an App, Step or function with the App and perform desired task such as calling mapped phone number, opening the App, opening a browser or even searching a specific website on a defaulted browser.

The system will allow a user to assign and remove the customizable letters/symbols/patterns. The system disables all defaulted letter/symbol patterns, such as for flashlight, 'C' for camera, 'T' for text, etc., for the user, so that the user is unable to assign those patterns to any other tools/Apps. The system retains a master list of available letters/symbols/numbers and provides for the user to add to or remove from that list.

While the system described above uses abbreviations consistent with the English language, those skilled in the art will recognize that the system and method of the present invention is not limited to any language and can be applied to letters/numbers/symbols used for any other language.

Once the character pattern 204 is scribbled on the locked screen 202, the system displays the actual character that matched with the pattern for a predetermined amount of time, such as about 1-2 seconds, on the locked screen 202 before accessing the desired App or feature on the device 200. The system allows the user to disregard or cancel accessing the App or feature if the matched letter/number/symbol was not desired. For example, if a user scribbles 'W', desiring to access WhatsApp, but the system matches it with M (for a different App), and displays either 'M' or the name of the different App, then the user can cancel access to the App within a predetermined amount of time, such as about 1-2 seconds, by giving another tap on the screen 202.

Optionally, certain Apps and features on electronic device 200 are not included in the Apps or features that can be opened by scribbling a pattern 204 on the screen 202. Such Apps and features can be apps and features that contain personal and/or financial information, such as bank accounts, credit cards, stock portfolios, etc., and require user authentication. These Apps and features by default are locked out from using the inventive system and the user cannot override the default.

When a new App is installed, the system will request the user to generate a scribble pattern specific 204 to that App. This request can be made right after the App's installation, on the first use of the App, after a certain amount of time after the app is installed onto device 200, or after a certain number of uses of the app on device 200, This function of can be adjustable by the user/system in the settings of the device 200.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A non-transitory machine-readable storage medium, having encoded thereon program code, wherein, when the program code is executed by an electronic device, the device implements a method for operating an application on the device without unlocking the device, the method comprising:
    (a) providing an electronic device requiring a method of authentication to unlock the device, the device having a screen, wherein the device is locked;
    (b) receiving a first recognizable scribbled pattern on the screen, the pattern being provided by a user, wherein the first recognizable scribbled pattern is associated with a first specific application; and
    (c) unlocking only the specific application for use by the user,
wherein a second specific application has been added to the device by the user and wherein the user creates a second recognizable scribbled pattern specific to the second specific application after installation of the second specific application on the device.

2. The storage medium according to claim 1, wherein the first recognizable scribbled pattern is predefined by the device.

3. The storage medium according to claim 2, wherein the first recognizable scribbled pattern can be changed to be associated with a second specific application.

4. The storage medium according to claim 1, wherein the first recognizable scribbled pattern is defined by the user.

5. The storage medium according to claim 1, wherein the first recognizable scribbled pattern is displayed on the screen as the first recognizable scribbled pattern is being scribbled.

6. The storage medium according to claim 1, wherein the first recognizable scribbled pattern is not displayed on the screen as the first recognizable scribbled pattern is being scribbled.

7. The storage medium according to claim 1, wherein the first recognizable scribbled pattern unlocks the screen independently of an operating system used by the device.

8. The storage medium according to claim 1 wherein the device recognizes the first recognizable scribbled pattern independently of an orientation of the device.

9. The storage medium according to claim 1, wherein the device requests the second recognizable scribbled pattern to be generated on the first use of the second specific application.

10. The storage medium according to claim 1, wherein the device requests the second recognizable scribbled pattern to be generated after a predetermined amount of time after the second specific application is added to the device.

11. The storage medium according to claim 1, wherein the device requests the second recognizable scribbled pattern to be generated after a predetermined number of uses of the second specific application on the device.

12. The storage medium according to claim 1, wherein a plurality of additional applications are on the device, wherein each of the additional applications has a specific scribbled pattern associated therewith.

13. The storage medium according to claim 1, wherein the first recognizable scribble pattern comprises a heart-shaped pattern.

14. The storage medium according to claim 1, wherein step (c) is performed only after the user single taps the screen after performing step (b).

15. The storage medium according to claim 1, wherein step (c) is performed only after the user double taps the screen after performing step (b).

16. The storage medium according to claim 1, wherein step (c) is performed only after the user performs an action on the screen after performing step (b).

17. The storage medium according to claim 1, wherein the device recognizes the first recognizable scribbled pattern regardless of a language used by the machine.

18. The storage medium according to claim 1, wherein the first recognizable scribble pattern unlocks only the phone for use by the user.

19. A non-transitory machine-readable storage medium, having encoded thereon program code, wherein, when the program code is executed by an electronic device, the device implements a method for operating an application on the device without unlocking the device, the method comprising:
(a) providing an electronic device requiring a method of authentication to unlock the device, the device having a screen, wherein the device is locked;
(b) receiving a first recognizable scribbled pattern on the screen, the pattern being provided by a user, wherein the first recognizable scribbled pattern is associated with a first specific application; and
(c) unlocking only the specific application for use by the user, wherein the device recognizes the first recognizable scribble pattern comprises the pattern "911" only when the pattern "9 1 1" with the first "1" scribbled to the right of the "9" and the second "1" scribbled after the first "1", is scribbled on the device.

* * * * *